(12) United States Patent
Akbari et al.

(10) Patent No.: US 10,233,926 B2
(45) Date of Patent: *Mar. 19, 2019

(54) STATORS FOR DOWNHOLE MOTORS, METHODS FOR FABRICATING THE SAME, AND DOWNHOLE MOTORS INCORPORATING THE SAME

(71) Applicant: Schlumberger Technology Corporation, Sugar Land, TX (US)

(72) Inventors: Hossein Akbari, Rosharon, TX (US); Julien Ramier, Cambridge (GB); Olivier Sindt, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 931 days.

This patent is subject to a terminal disclaimer.

(21) Appl. No.: 14/330,832

(22) Filed: Jul. 14, 2014

(65) Prior Publication Data

US 2015/0017047 A1 Jan. 15, 2015

Related U.S. Application Data

(62) Division of application No. 12/617,864, filed on Nov. 13, 2009, now Pat. No. 8,777,598.

(51) Int. Cl.
*F04C 13/00* (2006.01)
*B29C 70/74* (2006.01)
(Continued)

(52) U.S. Cl.
CPC .......... *F04C 13/008* (2013.01); *B29C 70/745* (2013.01); *E21B 4/02* (2013.01);
(Continued)

(58) Field of Classification Search
CPC ............. Y10T 29/49242; F04C 2/1075; F04C 13/008; F04C 2230/21
See application file for complete search history.

(56) References Cited

U.S. PATENT DOCUMENTS

| 2,464,011 A | 3/1949 | Wade |
| 4,646,856 A | 3/1987 | Dismukes |

(Continued)

FOREIGN PATENT DOCUMENTS

| CN | 1054470 A | 9/1991 |
| CN | 201056983 Y | 5/2008 |

(Continued)

OTHER PUBLICATIONS

International Search Report and Written Opinion issued in PCT/GB2010/001830 dated Jun. 10, 2011, 10 pages.

(Continued)

*Primary Examiner* — Matthew P Travers

(57) ABSTRACT

The present invention recites a method of fabricating a stator for a downhole motor, the method comprising the steps of providing a stator tube having an interior surface and applying a bonding agent to the interior surface of the stator tube. Additionally, a mandrel is positioned within the stator tube, the mandrel having an outer geometry that is complimentary to a desired inner geometry for the stator. Furthermore, a reinforcing material is introduced into the stator tube to fill space between the mandrel and the interior surface of the stator tube and subsequently solidified to bond the reinforcing material to the interior surface of the stator tube. The mandrel is then removed from the bonded stator tube and reinforcing material such that a stator is fabricated.

19 Claims, 10 Drawing Sheets

(51) Int. Cl.
F04C 2/107 (2006.01)
E21B 4/02 (2006.01)
B29K 101/10 (2006.01)
B29K 101/12 (2006.01)
B29L 23/00 (2006.01)

(52) U.S. Cl.
CPC ............ *F04C 2/107* (2013.01); *F04C 2/1071* (2013.01); *F04C 2/1075* (2013.01); *B29K 2101/10* (2013.01); *B29K 2101/12* (2013.01); *B29K 2905/08* (2013.01); *B29L 2023/22* (2013.01); *F04C 2230/21* (2013.01); *F05C 2201/0475* (2013.01); *F05C 2225/00* (2013.01); *F05C 2225/02* (2013.01); *F05C 2225/10* (2013.01); *F05C 2225/12* (2013.01); *F05C 2253/12* (2013.01); *F05C 2253/18* (2013.01); *F05C 2253/22* (2013.01); *Y10T 29/4932* (2015.01)

(56) References Cited

U.S. PATENT DOCUMENTS

| | | | |
|---|---|---|---|
| 4,909,337 | A | 3/1990 | Kochnev et al. |
| 5,113,953 | A | 5/1992 | Noble |
| 5,135,059 | A | 8/1992 | Turner et al. |
| 5,221,197 | A | 6/1993 | Kochnev et al. |
| 5,265,682 | A | 11/1993 | Russell et al. |
| 5,474,432 | A | 12/1995 | Hulley et al. |
| 5,520,255 | A | 5/1996 | Barr et al. |
| 5,553,678 | A | 9/1996 | Barr et al. |
| 5,553,679 | A | 9/1996 | Thorp |
| 5,582,259 | A | 12/1996 | Barr |
| 5,603,385 | A | 2/1997 | Colebrook |
| 5,673,763 | A | 10/1997 | Thorp |
| 5,685,379 | A | 11/1997 | Barr et al. |
| 5,695,015 | A | 12/1997 | Barr et al. |
| 5,706,905 | A | 1/1998 | Barr |
| 5,778,992 | A | 7/1998 | Fuller |
| 5,803,185 | A | 9/1998 | Barr et al. |
| 5,911,284 | A | 6/1999 | von Gynz-Rekowsk |
| 5,971,085 | A | 10/1999 | Colebrook |
| 6,089,332 | A | 7/2000 | Barr et al. |
| 6,092,610 | A | 7/2000 | Kosmala et al. |
| 6,158,529 | A | 12/2000 | Dorel |
| 6,173,794 | B1 | 1/2001 | von Gynz-Rekowski et al. |
| 6,244,361 | B1 | 6/2001 | Comeau et al. |
| 6,364,034 | B1 | 4/2002 | Schoeffler |
| 6,394,193 | B1 | 5/2002 | Askew |
| 6,527,512 | B2 | 3/2003 | Berlin et al. |
| 6,543,132 | B1 | 4/2003 | Krueger et al. |
| 6,543,554 | B2 | 4/2003 | Smith |
| 6,827,160 | B2 | 12/2004 | Blair et al. |
| 6,944,935 | B2 | 9/2005 | Hache |
| 7,093,401 | B2 | 8/2006 | Collin |
| 7,192,260 | B2 | 3/2007 | Lievstro et al. |
| 7,396,220 | B2 | 7/2008 | Delpassand et al. |
| 7,442,019 | B2 | 10/2008 | Kaiser et al. |
| 8,777,598 | B2 | 7/2014 | Akbari et al. |
| 2001/0005486 | A1 | 6/2001 | Wood |
| 2001/0052428 | A1 | 12/2001 | Larronde et al. |
| 2002/0011359 | A1 | 1/2002 | Webb et al. |
| 2002/0084029 | A1 | 7/2002 | Turner et al. |
| 2002/0122722 | A1 | 9/2002 | Bertin et al. |
| 2005/0089429 | A1 | 4/2005 | Delpassand et al. |
| 2005/0154090 | A1* | 7/2005 | Salvino ............... C08G 18/3246 523/400 |
| 2006/0182643 | A1 | 8/2006 | Delpassand et al. |
| 2006/0182644 | A1 | 8/2006 | Delpassand et al. |
| 2007/0036977 | A1* | 2/2007 | Sinclair ................. C09K 8/805 428/403 |
| 2008/0025859 | A1 | 1/2008 | Lee et al. |
| 2008/0050259 | A1 | 2/2008 | Hooper |
| 2008/0190669 | A1 | 8/2008 | Cioceanu |
| 2008/0304991 | A1 | 12/2008 | Speckert |
| 2008/0304992 | A1 | 12/2008 | Hooper et al. |
| 2009/0095528 | A1 | 4/2009 | Hay et al. |
| 2009/0169364 | A1* | 7/2009 | Downton ............... B22D 15/00 415/118 |
| 2010/0086425 | A1* | 4/2010 | Steele ..................... C25D 1/02 418/48 |

FOREIGN PATENT DOCUMENTS

| | | |
|---|---|---|
| DE | 3322095 A1 | 12/1984 |
| EP | 1693571 A2 | 8/2006 |
| RU | 2209911 C1 | 8/2003 |
| RU | 2283442 C1 | 9/2006 |
| RU | 2287655 C1 | 11/2006 |
| RU | 79314 U1 | 12/2008 |
| WO | 2009115819 A1 | 9/2009 |
| WO | 2011058294 A1 | 5/2011 |

OTHER PUBLICATIONS

Office Action issued in related RU application 2012124076 dated Nov. 19, 2015, 3 pages.
Second Office Action issued in related CN application 201080060817.8 dated Aug. 26, 2014, 10 pages.
Final Office Action issued in related RU application 2012124076 dated Apr. 12, 2016, 10 pages.
Lyons et al., Air & Gas Drilling Manual: Applications for Oil & Gas Recovery Wells & Geothermal Fluids Recovery Wells § 11.2 (3rd Ed. 2009).
Samuel, Downhole Drilling Tools: Theory & Practice for Engineers & Students 288-333 (2007).
Gelfgat et al., Advanced Drilling Solutions: Lessons from the FSU 154-72 (2003).
Standard Handbook of Petroleum & Natural Gas Engineering 4-276-4-299 (Lyons & Plisga, Editors 2006).
International Preliminary Search Report for PCT patent application No. PCT/GB10/001830 dated May 24, 2012.
Decision on Grant with English Translation for corresponding Russian Application Serial No. 2012124076/03(036791), dated Oct. 28, 2016, 13 pages.

* cited by examiner

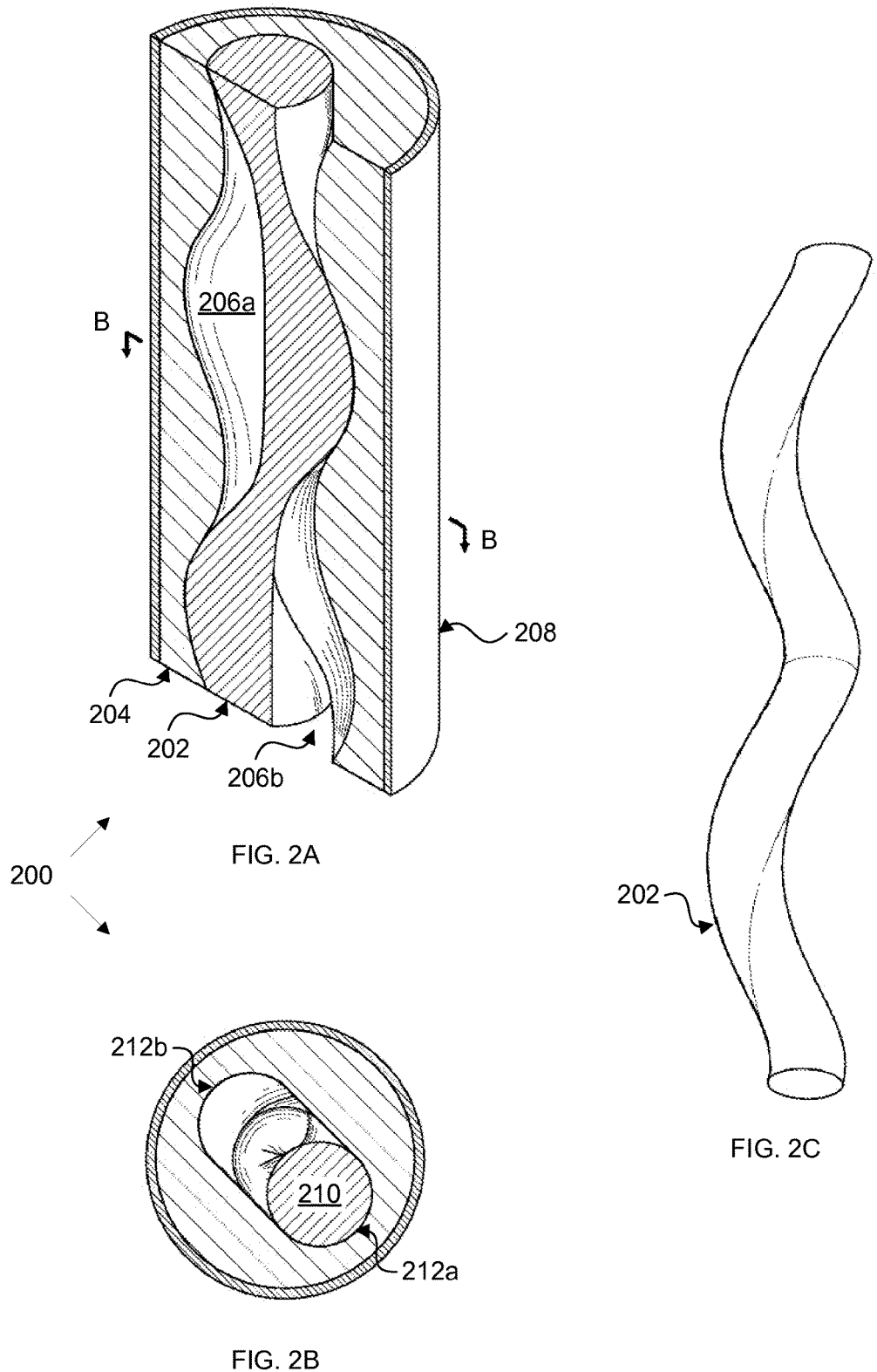

STATORS FOR DOWNHOLE MOTORS, METHODS FOR FABRICATING THE SAME, AND DOWNHOLE MOTORS INCORPORATING THE SAME

CROSS-REFERENCE TO RELATED APPLICATIONS

This application is a divisional of co-pending U.S. patent application Ser. No. 12/617,864, filed Nov. 13, 2009, which is herein incorporated by reference.

BACKGROUND OF THE INVENTION

Downhole motors (colloquially known as "mud motors") are powerful generators used in drilling operations to turn a drill bit, generate electricity, and the like. As suggested by the term "mud motor," mud motors are often powered by drilling fluid (e.g., "mud"). Such drilling fluid is also used to lubricate the drill string and to carry away cuttings and, accordingly, often contains particulate matter such as borehole cuttings that can reduce the useful life of downhole motors. Accordingly, there is a need for new approaches for cost effectively manufacturing downhole motors and downhole motor components that are cost effective and facilitate quick replacement in the field.

SUMMARY OF THE INVENTION

The present invention generally relates to a method of fabricating a stator for a downhole motor wherein the method comprises the steps of providing a stator tube having an interior surface, applying a bonding agent to the interior surface of the stator tube, positioning a mandrel within the stator tube, the mandrel having an outer geometry that is complimentary to a desired inner geometry for the stator and introducing a reinforcing material into the stator tube to fill space between the mandrel and the interior surface of the stator tube. Additionally, the reinforcing material is solidified to bond the reinforcing material to the interior surface of the stator tube and then the mandrel is removed from the bonded stator tube and reinforcing material such that a stator is fabricated.

In accordance with one aspect of the present invention, the stator tube comprises a material selected from the group consisting of: iron, steel, high speed steel, carbon steel, tungsten steel, brass, and copper.

Additionally, the bonding agent utilized in fabricating the stator may be a single-layer bonding agent or a multiple-layer bonding agent.

In accordance with one aspect of the present invention, the mandrel may comprise a material selected from the group consisting of: iron, steel, high speed steel, carbon steel, tungsten steel, brass, and copper. Additionally, the mandrel may be coated with a release agent having numerous forms including a solid, semi-solid or a liquid.

The reinforcing material of the present invention may take numerous forms as understood by one skilled in the art. For example, the reinforcing material may be a composite. In accordance with another aspect of the present invention, the reinforcing material may be a polymer. In accordance with a further aspect of the present invention, the reinforcing material may be a thermosetting plastic or a thermoplastic.

As understood by one skilled in the art, the reinforcing material of one aspect of the present invention may be selected from the group consisting of: epoxy resins, polyimides, polyketones, polyetheretherketones (PEEK), phenolic resins, and polyphenylene sulfides (PPS).

Additionally, the reinforcing material may be in various forms including a liquid, a paste, a slurry, a power, and/or a granular form. Furthermore, the reinforcing material may be cross-linked and/or may have a high degree of crystallinity.

In accordance with aspects of the present invention, when solidifying the reinforcing material to bond the reinforcing material to the interior surface of the stator tube various techniques may be utilized. These techniques may include, but are not limited to the use of heat curing, radiation curing, steam curing, and cooling.

The present invention further claims a stator for a downhole motor, the stator comprising a stator tube including an inner surface and a solidified reinforcing material bonded to the inner surface, the solidified reinforcing material having an inner surface defining an internal helical cavity including a plurality of internal lobes. Additionally, the present invention recites a downhole motor comprising a stator wherein said stator comprises a stator tube including an inner surface and a solidified reinforcing material bonded to the inner surface, the solidified reinforcing material having an inner surface defining an internal helical cavity including a plurality of internal lobes and a rotor received within the stator. In accordance with the present invention, the rotor may be coated with an elastomer, wherein the elastomer may comprise one or more selected from the group consisting of: rubber, natural rubber (NR), synthetic polyisoprene (IR), butyl rubber, halogenated butyl rubber, polybutadiene (BR), nitrile rubber, nitrile butadiene rubber (NBR), hydrogenated nitrile butadiene rubber (HNBR), carboxylated hydrogenated nitrile butadiene rubber (XHNBR), chloroprene rubber (CR) Fluorocarbon rubber (FKM), and Perfluoroelastomers (FFKM).

DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIGS. 2A-2C illustrate a Moineau-type positive displacement downhole motor having a 1:2 lobe profile according to one embodiment of the invention;

DETAILED DESCRIPTION OF THE INVENTION

Embodiments of the invention provide stators and stator inserts for downhole motors, methods for fabricating the same, and downhole motors incorporating the same. Various embodiments of the invention can be used in wellsite systems.

Wellsite System

Figure 1:
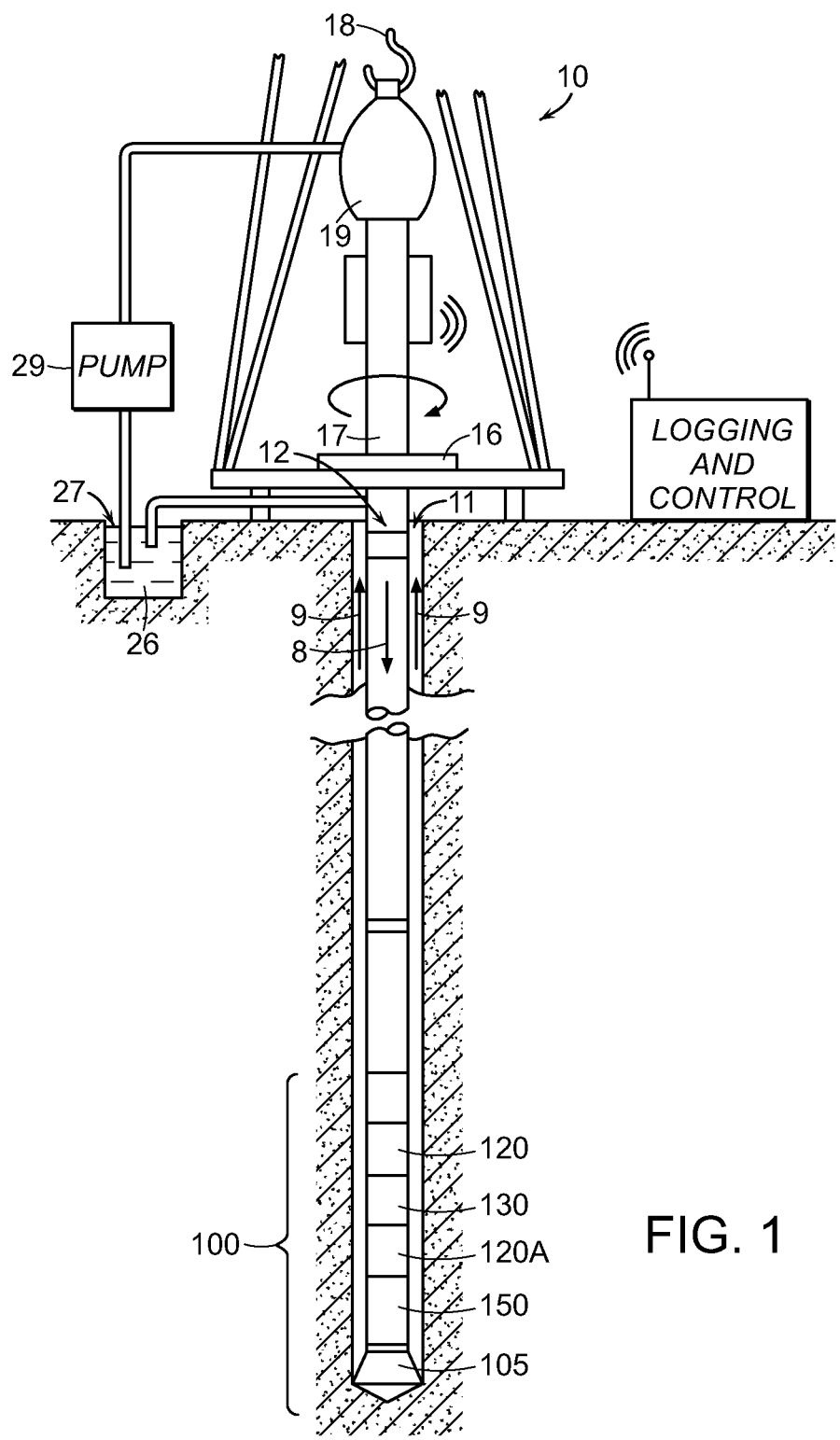
FIG. 1 illustrates a wellsite system in which the present invention can be employed.
Figure 3A:
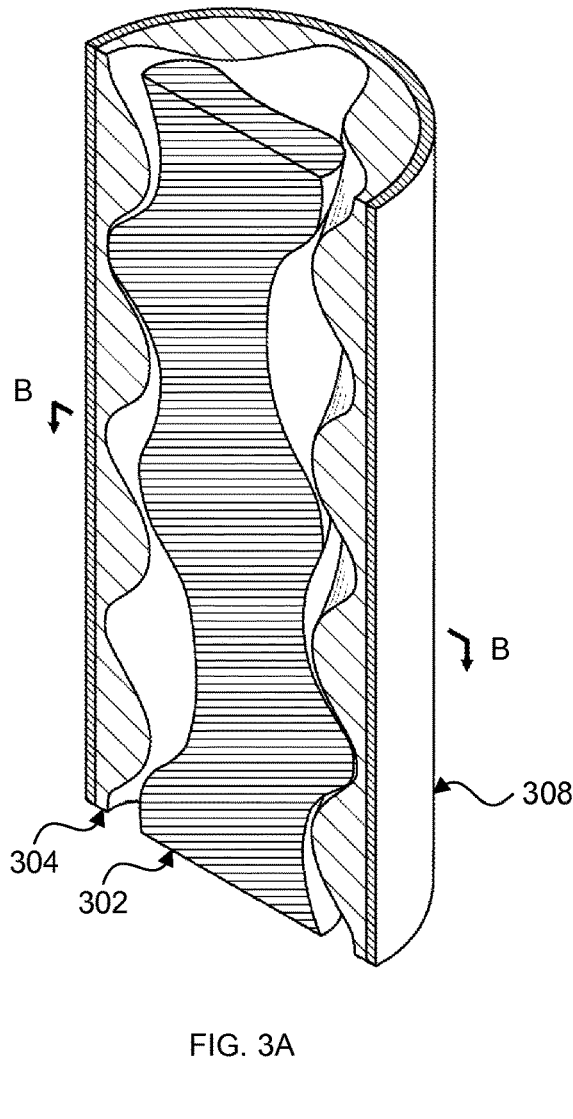
FIGS. 3A-3F illustrate a Moineau-type positive displacement downhole motor having a 3:4 lobe profile according to one embodiment of the invention.
Figure 3B:
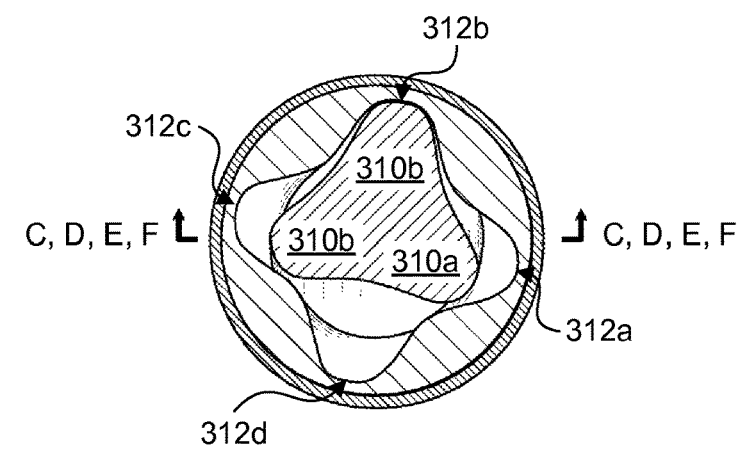
Figure 3C:
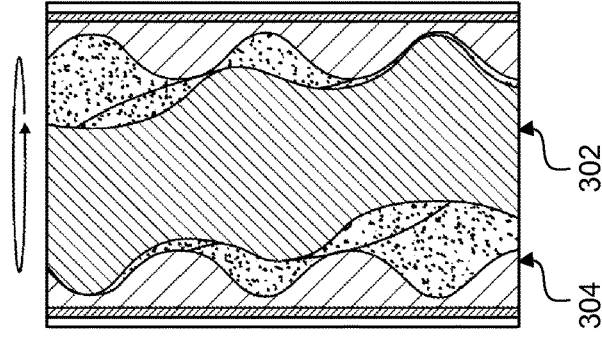
Figure 3D:
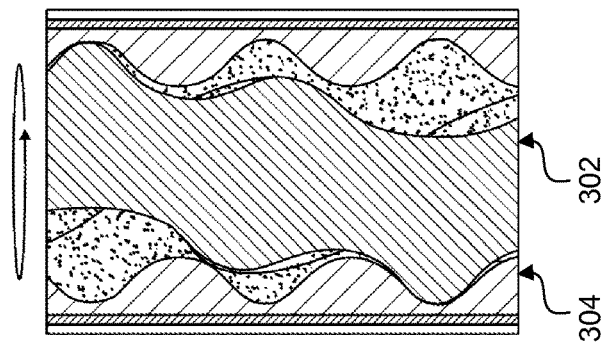
Figure 3E:
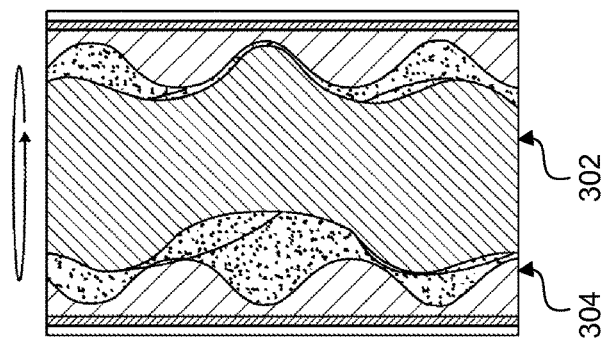
Figure 3F:
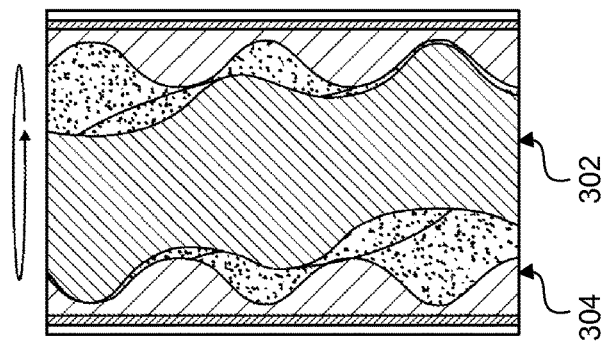

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly (BHA) 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a pressure measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator (also known as a "mud motor") powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction.

Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well.

A directional drilling system may also be used in vertical drilling operation as well. Often the drill bit will veer off of a planned drilling trajectory because of the unpredictable nature of the formations being penetrated or the varying forces that the drill bit experiences. When such a deviation occurs, a directional drilling system may be used to put the drill bit back on course.

A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems.

In the point-the-bit system, the axis of rotation of the drill bit is deviated from the local axis of the bottom hole assembly in the general direction of the new hole. The hole is propagated in accordance with the customary three-point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems and how they operate are described in U.S. Pat. Nos. 6,394,193; 6,364,034; 6,244,361; 6,158,529; 6,092,610; and 5,113,953; and U.S. Patent Application Publication Nos. 2002/0011359 and 2001/0052428.

In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form, the drill bit is required to cut side ways in order to generate a curved hole. Examples of push-the-bit type rotary steerable systems and how they operate are described in U.S. Pat. Nos. 6,089,332; 5,971,085; 5,803,185; 5,778,992; 5,706,905; 5,695,015;

5,685,379; 5,673,763; 5,603,385; 5,582,259; 5,553,679; 5,553,678; 5,520,255; and 5,265,682.

Downhole Motors

Referring now to FIGS. 2A-2C, a Moineau-type positive displacement downhole motor 200 is depicted. Downhole motor 200 includes a rotor 202 received within a stator 204. Rotor 202 can be a helical member fabricated from a rigid material such metals, resins, composites, and the like. Stator 204 can have an oblong, helical shape and be fabricated from elastomers that allow for the rotor 202 to rotate within the stator 204 as fluid flows between chambers 206 formed between the rotor 202 and the stator 204. In some embodiments, stator 204 is received within stator tube 208 that can partially limit the deformation of the stator 204 as the rotor 202 rotates and can protect the exterior of stator 204 from wear.

Downhole motors 200 can be fabricated in a variety of configurations. Generally, when viewed as a latitudinal cross-section as depicted in FIG. 1B, rotor 202 has $n_r$ lobes and stator 204 has $n_s$ lobes, wherein $n_s=n_r+1$. For example, FIGS. 2A-2C depict a downhole motor 200 with a 1:2 lobe profile, wherein rotor 202 has one lobe 210 and stator 204 has two lobes 212. FIGS. 3A-3F depict a downhole motor 300 with a 3:4 lobe profile, wherein rotor 302 has three lobes 310 and stator 304 has four lobes 312. Other exemplary lobe profiles include 5:6, 7:8, 9:10, and the like.

The rotation of rotor 302 is depicted in FIGS. 3C-3F.

Downhole motors are further described in a number of publications such as U.S. Pat. Nos. 7,442,019; 7,396,220; 7,192,260; 7,093,401; 6,827,160; 6,543,554; 6,543,132; 6,527,512; 6,173,794; 5,911,284; 5,221,197; 5,135,059; 4,909,337; 4,646,856; and 2,464,011; U.S. Patent Application Publication Nos. 2009/0095528; 2008/0190669; and 2002/0122722; and William C. Lyons et al., *Air & Gas Drilling Manual: Applications for Oil & Gas Recovery Wells & Geothermal Fluids Recovery Wells* § 11.2 (3d ed. 2009); G. Robello Samuel, *Downhole Drilling Tools: Theory & Practice for Engineers & Students* 288-333 (2007); *Standard Handbook of Petroleum & Natural Gas Engineering* 4-276-4-299 (William C. Lyons & Gary J. Plisga eds. 2006); and 1 Yakov A. Gelfgat et al., *Advanced Drilling Solutions: Lessons from the FSU* 154-72 (2003).

Methods of Producing Stators

Figure 4:
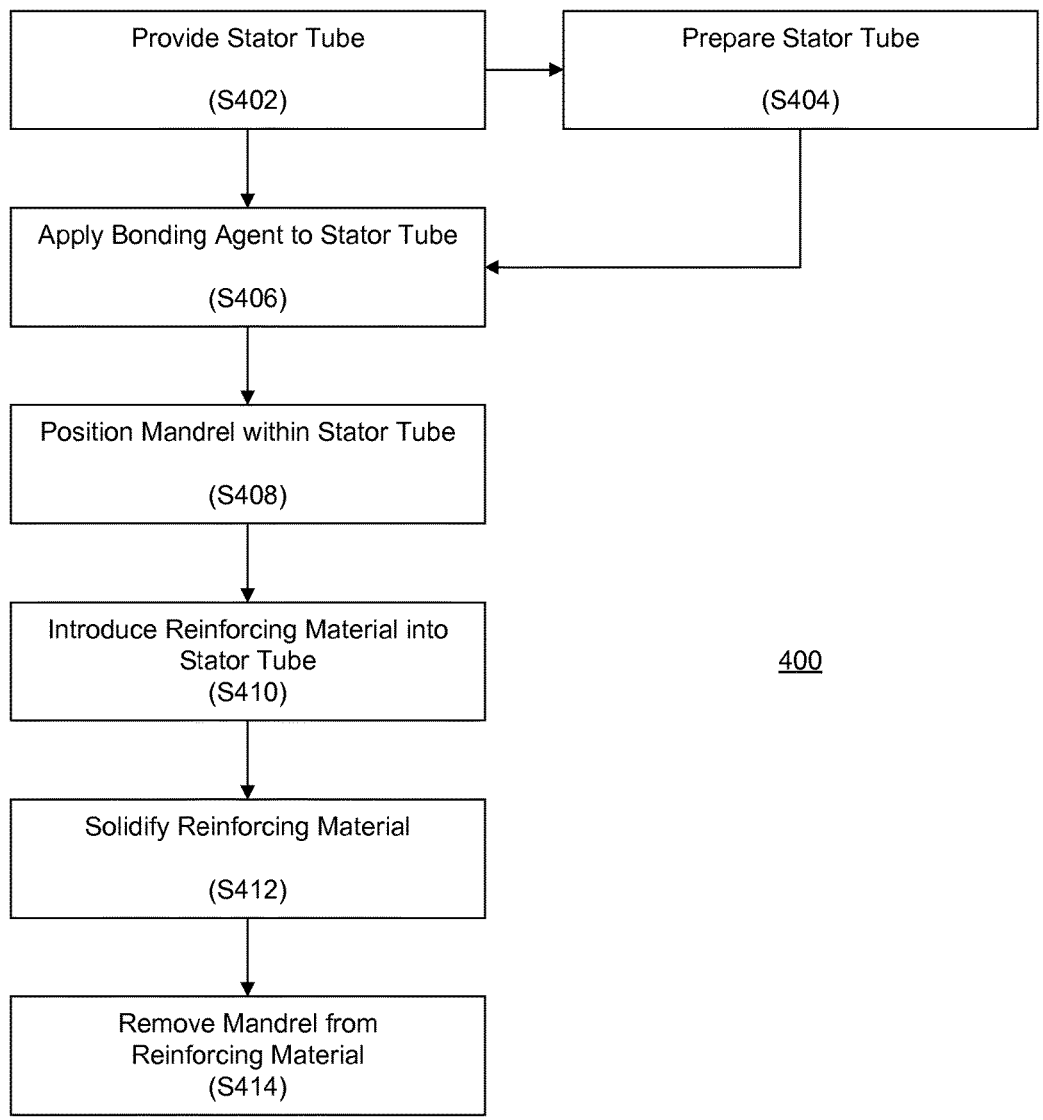
FIGS. 4 and 5A-5D illustrate a method of producing a stator according to one embodiment of the invention.
Figure 5A:
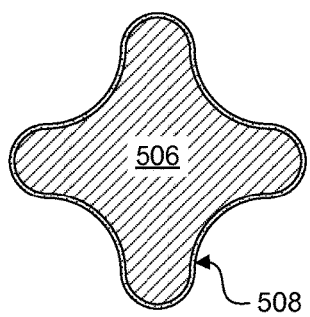
Figure 5B:
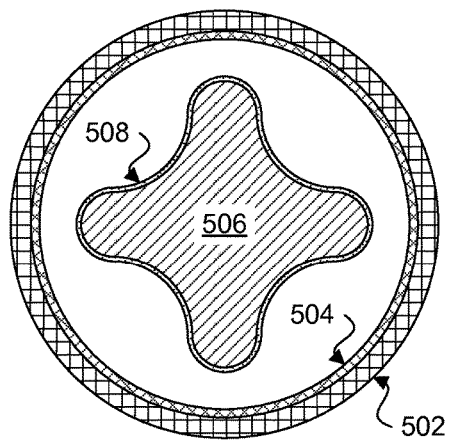
Figure 5C:
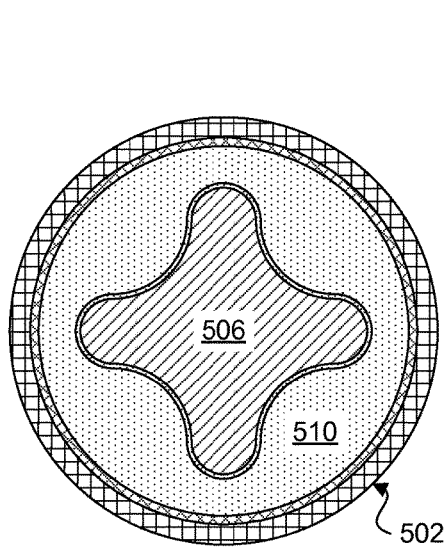
Figure 5D:
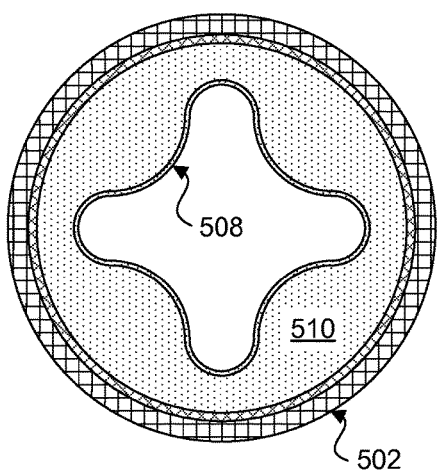

Referring now to FIG. 4 in the context of FIGS. 5A-5D, a method 400 of producing a stator 500 is provided. Lateral slices without depth are depicted in FIGS. 5A-5D for ease of illustration and comprehension.

In step S402, a stator tube 502 is provided. As discussed herein, stator tube 502 can be a rigid material. For example, stator tube 502 can be fabricated from iron, steel, high speed steel, carbon steel, tungsten steel, brass, copper, and the like.

Optionally, in step S404, the interior surface of the stator tube 502 is prepared. In some embodiments, a worn stator insert is removed from the stator tube 502. In other embodiments, the inner surface of the stator tube 502 is cleaned, degreased, sand blasted, shot blasted, and the like.

In step S406, a bonding agent 504 is applied to the interior surface of the stator tube 502. The bonding agent 504 can be a single-layer bonding agent or a multiple-layer bonding agent. One skilled in the art will recognize that numerous suitable bonding agents existing, including but not limited to epoxy resin, phenolic resin, polyester resin or any number of suitable alternatives.

In step S408, a mandrel 506 is positioned within the stator tube 502. Preferably the mandrel 506 is centered within the stator tube 502 such that the longitudinal axis of the mandrel 506 is coaxial with the longitudinal axis of the stator tube 502. The mandrel 506 has an outer geometry that is complimentary to a desired inner geometry of the stator 500 to be produced. For example, mandrel 506 can have an oblong, helical shape and have ns lobes (e.g., four lobes in the embodiment depicted in FIG. 5A).

In some embodiments, the mandrel 506 is coated with a release agent (not depicted) to promote removal of the mandrel 506. Additionally or alternatively, one or more resilient layers 508 can be applied to the mandrel 506 (e.g., over the release agent) to strengthen the stator 500. For the purpose of clarity, the term reinforcing/resilient layer will be used interchangeably within the present specification. For example, a resilient layer 508 can be formed from an elastomers such as rubber, natural rubber (NR), synthetic polyisoprene (IR), butyl rubber, halogenated butyl rubber, polybutadiene (BR), nitrile rubber, nitrile butadiene rubber (NBR), hydrogenated nitrile butadiene rubber (HNBR), carboxylated hydrogenated nitrile butadiene rubber (XHNBR), chloroprene rubber (CR), and the like. In still another embodiment, the resilient layer 508 can be reinforced with a fiber or textile such as poly-aramid synthetic fibers such as KEVLAR® fiber available from E.I. Du Pont de Nemours and Company of Wilmington, Del.

In some embodiments, a bonding agent (not depicted) is applied to the resilient layer 508. The bonding agent can be a single-layer bonding agent or a multiple-layer bonding agent.

In step S410, a reinforcing material 510 is introduced into the stator tube 502. Examples of suitable reinforcing materials 510 are discussed herein.

In step S412, the reinforcing material 510 is solidified as discussed herein.

In step S414, the mandrel 506 is removed from the solidified stator 500.

Methods of Producing Stator Inserts

Figure 6:
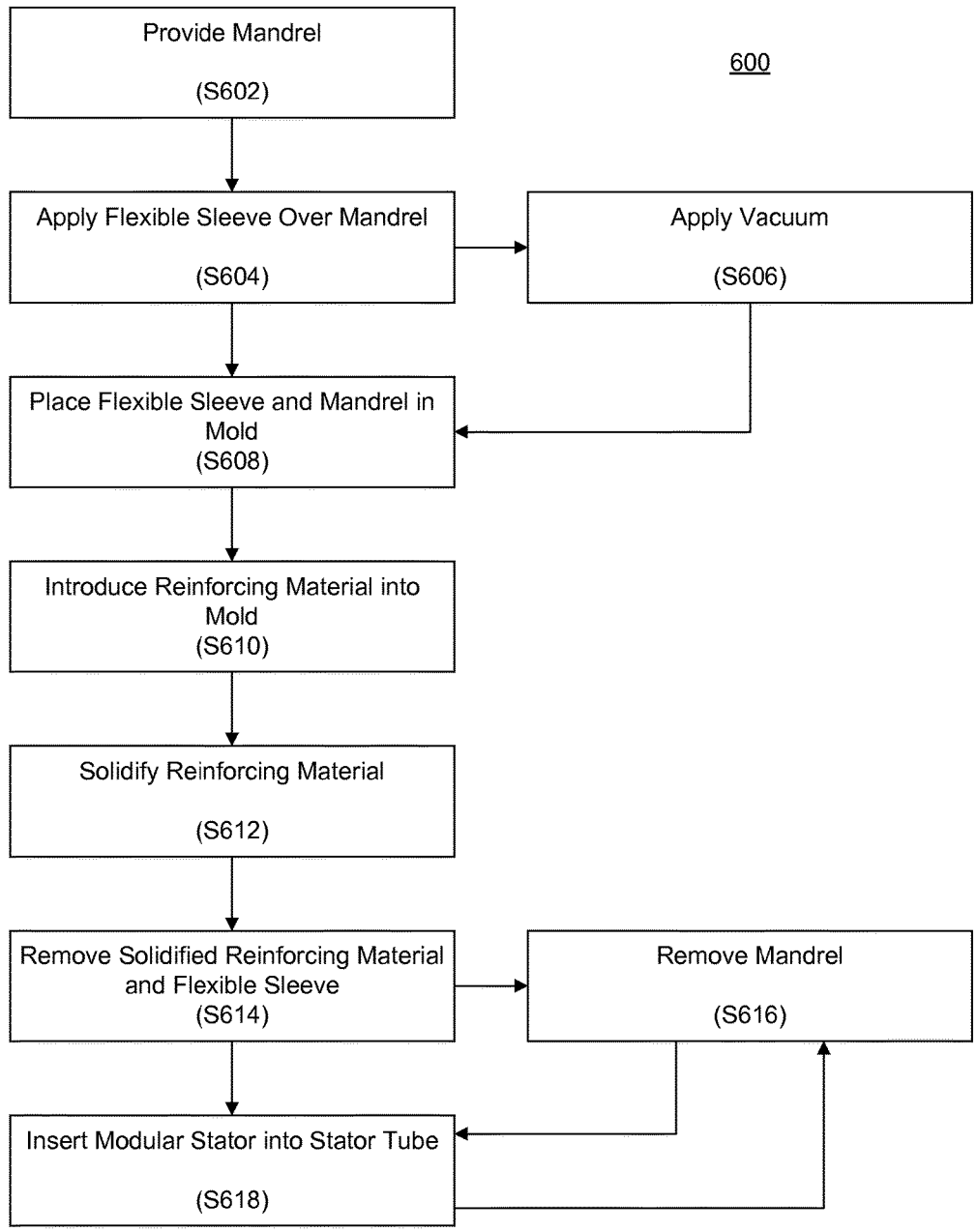
FIGS. 6 and 7A-7D illustrate a method of producing a stator insert according to one embodiment of invention.
Figure 7A:
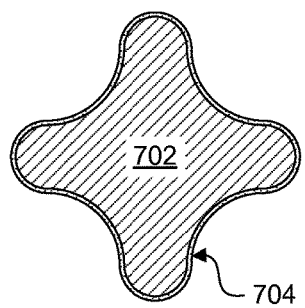
Figure 7B:
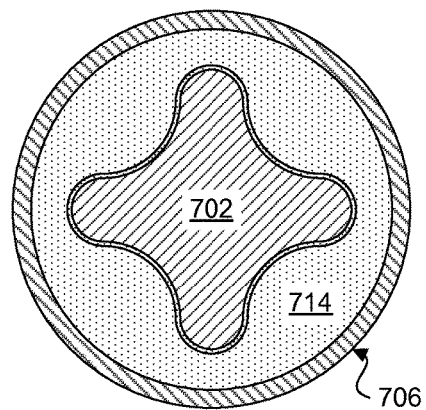
Figure 7C:
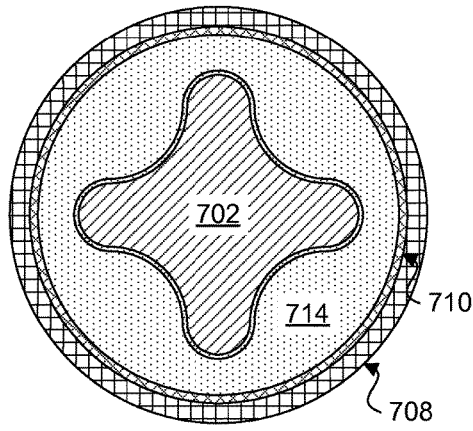
Figure 7D:
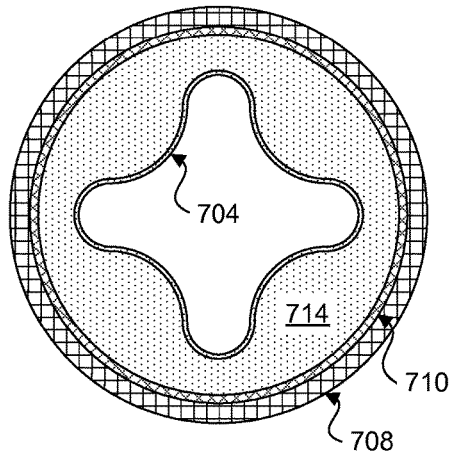

Referring now to FIG. 6 in the context of FIGS. 7A-7D, a method 600 of producing stator inserts is provided. Lateral slices without depth are depicted in FIGS. 7A-7D for ease of illustration and comprehension.

In step S602, a mandrel 702 is provided. The mandrel 702 has an outer geometry that is complimentary to a desired inner geometry of the stator insert to be produced. For example, mandrel 702 can have an oblong, helical shape and have $n_s$ lobes (e.g., four lobes in the embodiment depicted in FIG. 7A).

In step S604, a flexible sleeve 704 is applied over mandrel 702. The flexible sleeve 704 can be an elastomer. For example, the elastomers can be rubber, natural rubber (NR), synthetic polyisoprene (IR), butyl rubber, halogenated butyl rubber, polybutadiene (BR), nitrile rubber, nitrile butadiene rubber (NBR), hydrogenated nitrile butadiene rubber (HNBR), carboxylated hydrogenated nitrile butadiene rubber (XHNBR), chloroprene rubber (CR), Fluorocarbon rubber (FKM), Perfluoroelastomers (FFKM) and the like. In still another embodiment, the flexible sleeve 704 can be reinforced using a fiber or textile such as poly-aramid synthetic fibers such as KEVLAR® fiber available from E.I. Du Pont de Nemours and Company of Wilmington, Del.

In some embodiments, a lubricant or release agent (e.g., liquids, gels, and/or powders) are applied between the flexible sleeve 704 and mandrel 702 to facilitate insertion and removal of the mandrel 702. Preferably, the lubricant/release layer is compatible with the mandrel 702 and the flexible sleeve 704. One skilled in the art will recognize that this lubricant/release layer may take numerous forms, including but not limited to a permanent or semi-permanent layer having a solid or liquid form.

Optionally, in step S606, a vacuum is applied between the flexible sleeve and the mandrel to cause the flexible sleeve 704 to better conform to the geometry of the mandrel 702. In some embodiments, a vacuum is not needed as the flexible material 704 conforms to the mandrel geometry without the need for physical manipulation.

In step S608, the assembled flexible sleeve 704 and mandrel 702 are placed within a mold 706. Preferably the mandrel 702 is centered within the mold 706 such that the longitudinal axis of the mandrel 702 is coaxial with the longitudinal axis of the mold 706. In some embodiments, inner geometry of the mold 706 is complimentary to the stator tube 708 into which the molded stator insert will be installed (less any allowances for adhesives 710, expansion, contraction, and the like). For example, the stator insert can have a substantially circular outer profile and the stator tube 708 can have a substantially circular inner profile.

Figure 8:
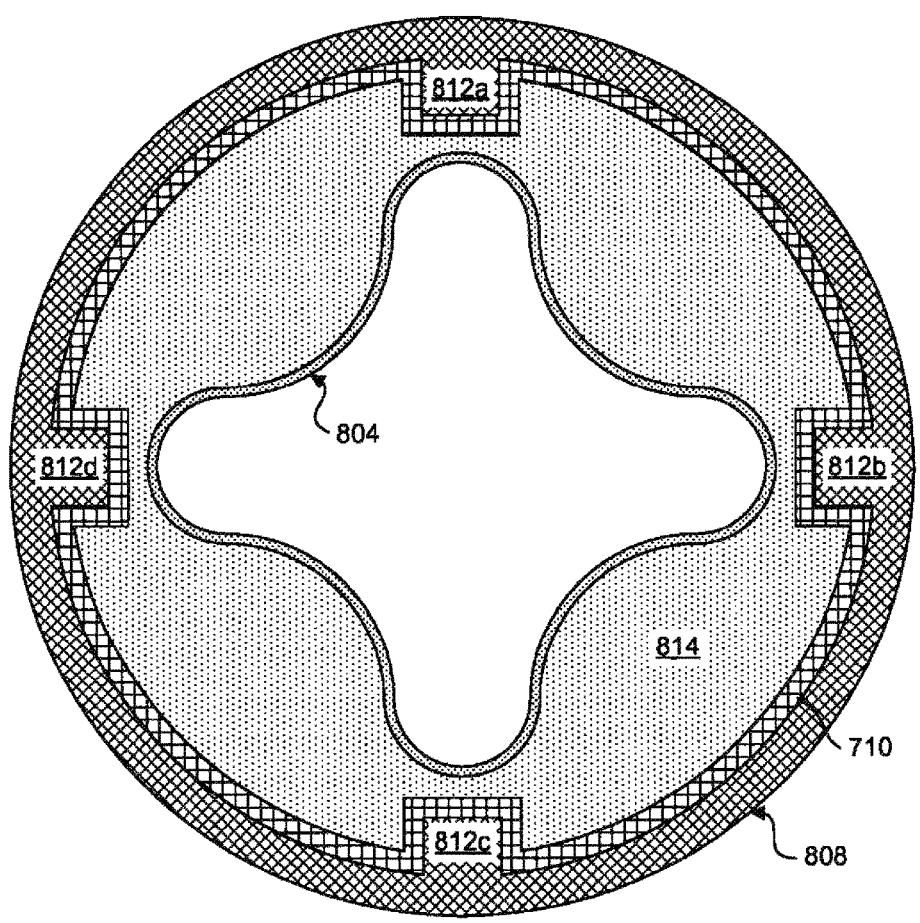
FIG. 8 illustrates a stator tube and a stator insert having a splined geometry according to one embodiment of the invention.

In another embodiment depicted in FIG. 8, the stator tube 808 can have a plurality of splines 812 and stator insert 814 can include a plurality of complimentary splines to provide mechanical retention of the stator insert 814 within the stator tube 808. In accordance with an alternative embodiment, one skilled in the art will readily recognize that the inside and outside walls of the stator tube are not necessarily parallel.

In step S610, a reinforcing material 714 is introduced into the mold. Examples of suitable reinforcing materials 714 are discussed herein.

Optionally, a release agent and/or a lubricant can be applied to the interior surface of mold 706 prior to the introduction of the reinforcing material 714 in order to promote removal of the solidified stator insert from the mold 706.

Additionally or alternatively, a bonding agent (not depicted) can be applied to the flexible sleeve 704 prior to the introduction of the reinforcing material 714 in order to promote bonding of the reinforcing material 714 with the flexible sleeve 704.

In step S612, the reinforcing material 714 is solidified as discussed herein.

In step S614, the solidified reinforcing material 714 and the flexible sleeve 704 are removed from the mold 706. In some embodiments, the exterior surface of the solidified stator insert is treated to promote better bonding with stator tube 708. For example, the solidified stator insert can be cleaned, degreased, sand blasted, shot blasted, and the like.

In step S616, the mandrel 702 is optionally removed from the solidified stator insert prior to insertion of the stator into the stator tube 708 in step S618. In another embodiment, mandrel 702 is removed from the solidified stator insert after insertion into the stator tube 708.

A variety of techniques can be used to prepare the stator tube 708 to receive the solidified stator insert. In some embodiments, a worn stator insert is removed from the stator tube 708. In other embodiments, the inner surface of the stator tube 708 is cleaned, degreased, sand blasted, shot blasted, and the like.

In some embodiments, the stator insert is coupled to the inner surface of the stator tube 708. The stator insert can be coupled to the stator tube 708 with an adhesive 710. For example, the adhesive 710 can be applied to the outside of the stator insert and/or the inside of the stator tube 708. Alternatively, the adhesive 710 can be flowed or injected, at pressure or under vacuum, between the stator insert and the stator tube 708 after the stator insert is inserted. A variety of adhesives 710 can be used including epoxies, poly(methyl methylacrylate), polyurethane-based adhesives, and the like.

Reinforcing Materials and Methods of Solidifying

The reinforcing materials 510, 714 discussed herein can be a variety of materials including composites, polymers, thermosetting plastic, thermoplastics, and the like. Exemplary polymers include epoxy resins, polyimides, polyketones, polyetheretherketones (PEEK), phenolic resins, polyphenylene sulfides (PPS), and the like. The reinforcing materials 510, 714 can be introduced in a variety of forms including a liquid, a paste, a slurry, a powder, a granular form, and the like. In accordance with aspects of the present invention, the reinforcing materials may include, but are not limited to numerous liquids, pastes or powders that may be solidified. In accordance with one aspect of the present invention, these may be ceramics or cements.

The reinforcing materials 510, 714 can be cross-linked. Additionally or alternatively, the reinforcing materials 510, 714 can have a high degree of crystallinity.

Solidifying of reinforcing materials 510, 714 may be accomplished by a variety of techniques including chemical additives, ultraviolet radiation, electron beams, heating, exposure to either a part or the full microwave spectrum, steam curing, cooling, and the like. Solidifying processes may vary between particular reinforcing materials 510, 714, but can be ascertained from manufacturer's specifications and general chemistry principles. In some embodiments, the reinforcing material 510, 714 is solidified under pressure to promote bonding and/or increase mechanical properties with the resilient layers 508 or flexible sleeve 704, to press the resilient layers 508 or flexible sleeve 704 against the geometry of mandrel 506, 702, and to improve the mechanical properties of the reinforcing materials 510, 174. For example, experiments reveal improvements of about 20% in $T_g$, stiffness, and toughness when the reinforcing material is solidified under pressure.

Additional Methods of Producing Stators

Figure 9:
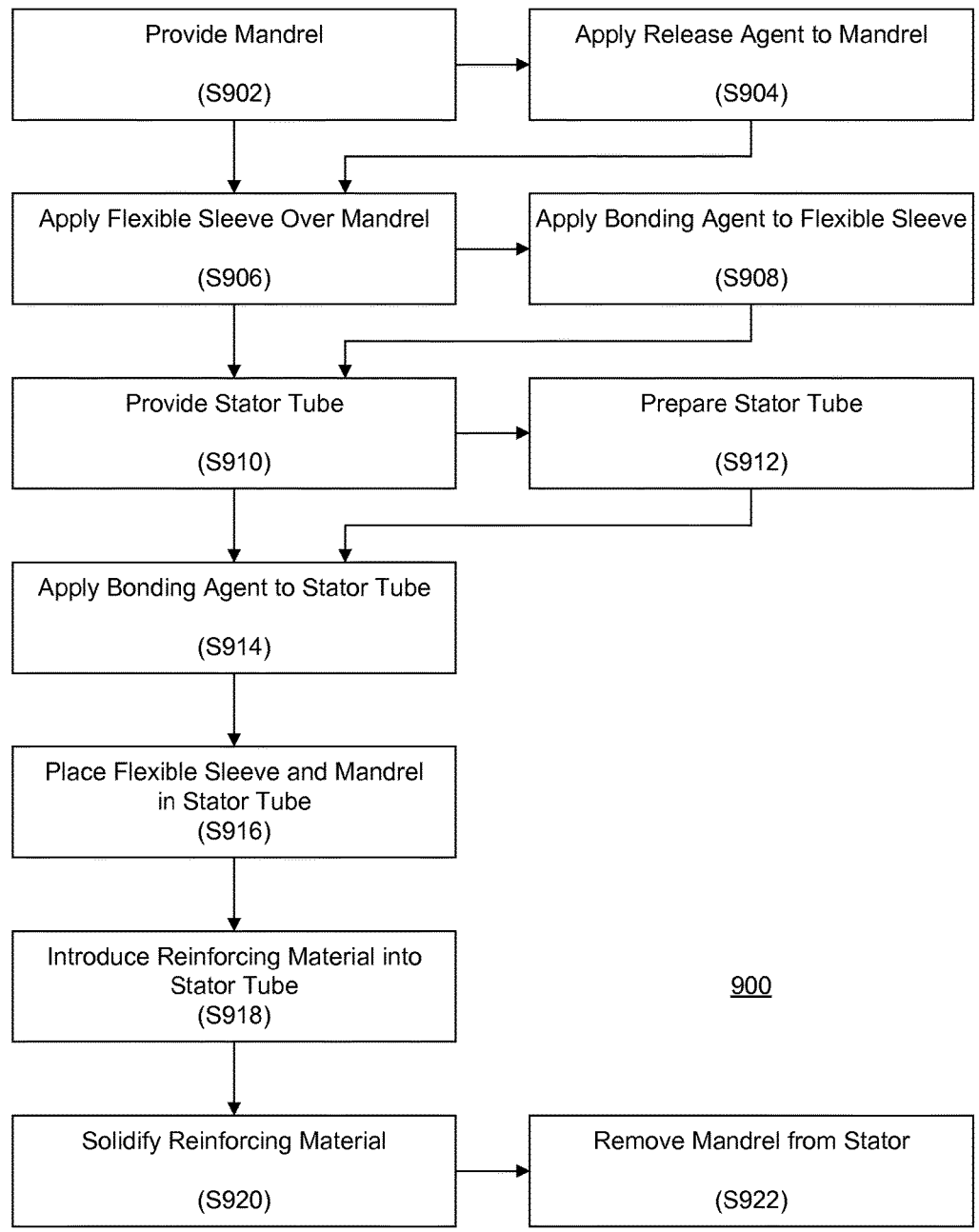
FIG. 9 illustrates an alternative method of producing a stator according to one embodiment of the invention.

Referring now to FIG. 9 in the context of FIGS. 5A-5D, a method 900 of producing a stator 500 is provided. Lateral slices without depth are depicted in FIGS. 5A-5D for ease of illustration and comprehension.

In step S902, a mandrel 506 is provided. The mandrel 506 can have an outer geometry that is complimentary to the desired inner geometry for the stator 500. For example, mandrel 506 can have an oblong, helical shape and have ns lobes (e.g., four lobes in the embodiment depicted in FIG. 5A).

Optionally, in step S904, the mandrel 506 can be coated with a release agent (not depicted) to promote removal of the mandrel 506 from the flexible sleeve 508.

In step S906, a flexible sleeve 508 is applied over the mandrel 506. The flexible sleeve 508 can be formed from an elastomers such as rubber, natural rubber (NR), synthetic polyisoprene (IR), butyl rubber, halogenated butyl rubber, polybutadiene (BR), nitrile rubber, nitrile butadiene rubber (NBR), hydrogenated nitrile butadiene rubber (HNBR), carboxylated hydrogenated nitrile butadiene rubber (XHNBR), chloroprene rubber (CR), Fluorocarbon rubber (FKM), Perfluoroelastomers (FFKM) and the like. In still another embodiment, the flexible sleeve 508 can be reinforced with a fiber or textile such as poly-aramid synthetic fibers such as KEVLAR® fiber available from E.I. Du Pont de Nemours and Company of Wilmington, Del.

Optionally, in step S908, a bonding agent (not depicted) is applied to the exterior surface of the flexible sleeve 508. The bonding agent can be a single-layer bonding agent or a multiple-layer bonding agent.

In step S910, a stator tube 502 is provided. As discussed herein, stator tube 502 can be a rigid material. For example, stator tube 502 can be fabricated from iron, steel, high speed steel, carbon steel, tungsten steel, brass, copper, and the like.

Optionally, in step S912, the interior surface of the stator tube 502 is prepared. In some embodiments, a worn stator insert is removed from the stator tube 502. In other embodiments, the inner surface of the stator tube 502 is cleaned, degreased, sand blasted, shot blasted, and the like.

In step S914, a bonding agent 504 is applied to the interior surface of the stator tube 502. The bonding agent 504 can be a single-layer bonding agent or a multiple-layer bonding agent. In accordance with the present invention a variety of Bonding agents may be use, including but not limited to Hunstman CW47/HY33 or Chemosil 310. In step S916, the flexible sleeve 508 and mandrel 506 is positioned within the stator tube 502. Preferably the mandrel 506 and flexible sleeve 508 is centered within the stator tube 502 such that the longitudinal axis of the mandrel 506 is coaxial with the longitudinal axis of the stator tube 502.

In step S918, a reinforcing material 510 is introduced to fill the space between flexible sleeve 508 and the stator tube 502. Examples of suitable reinforcing materials 510 are discussed herein.

In step S920, the reinforcing material 510 is solidified as discussed herein.

Optionally, in step S922, the mandrel 506 is removed from the stator 500.

INCORPORATION BY REFERENCE

All patents, published patent applications, and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

The invention claimed is:

1. A method of fabricating a stator for a downhole motor, the method comprising:
   positioning an elastomeric sleeve about a mandrel;
   positioning the mandrel and the elastomeric sleeve at least partially within a mold, the mandrel having an outer geometry that is complimentary to a desired inner geometry for a stator insert;
   introducing a reinforcing material into the mold to fill space between an outer surface of the elastomeric sleeve and an interior surface of the mold;
   solidifying the reinforcing material to bond the reinforcing material to the elastomeric sleeve, thereby producing the stator insert which comprises at least the elastomeric sleeve and the reinforcing material;
   removing the stator insert from the mold;
   treating an outer surface of the reinforcing material to promote engagement with a stator tube; and
   bonding the outer surface of the reinforcing material to the stator tube with an adhesive to further secure the stator insert within the stator tube.

2. The method of claim 1, wherein the stator tube comprises a material selected from the group consisting of: iron, steel, high speed steel, carbon steel, tungsten steel, brass, and copper.

3. The method of claim 1, wherein the mandrel comprises a material selected from the group consisting of: iron, steel, high speed steel, carbon steel, tungsten steel, brass, and copper.

4. The method of claim 1, wherein the mandrel is coated with a release agent.

5. The method of claim 1, wherein the reinforcing material is a composite.

6. The method of claim 1, wherein the reinforcing material is a polymer.

7. The method of claim 6, wherein the reinforcing material is a thermosetting plastic.

8. The method of claim 6, wherein the reinforcing material is a thermoplastic.

9. The method of claim 6, wherein the reinforcing material comprises one or more selected from the group consisting of: epoxy resins, polyimides, polyketones, polyetheretherketones (PEEK), phenolic resins, and polyphenylene sulfides (PPS).

10. The method of claim 1, wherein the reinforcing material is in a form selected from the group consisting of: a liquid, a paste, a slurry, a power, and granular.

11. The method of claim 1, wherein the reinforcing material is cross-linked.

12. The method of claim 1, wherein the step of solidifying the reinforcing material to bond the reinforcing material to the elastomeric sleeve further comprises one or more techniques selected from the group consisting of: heat curing, radiation curing, steam curing, and cooling.

13. The method of claim 1, wherein the stator tube comprises a plurality of inwardly-extending splines, the method further comprising receiving the plurality of inwardly-extending splines into grooves formed in the outer surface of the reinforcing material, the splines and grooves being configured to retain a position of the stator insert with respect to the stator tube.

14. The method of claim 1, further comprising applying a bonding agent to an outer surface of the elastomeric sleeve, wherein the bonding agent bonds the outer surface of the elastomeric sleeve to the reinforcing material.

15. The method of claim 1, wherein the stator tube has a plurality of splines extending inwardly from an inner surface thereof, and further comprising positioning the stator insert within the inner surface of the stator tube along the plurality of splines prior to bonding the outer surface of the reinforcing material to the stator tube.

16. The method of claim 15, wherein an inner surface of the reinforcing material defines an internal helical cavity including a plurality of internal lobes, and wherein the elastomeric sleeve is attached to the reinforcing material along the extent of the plurality of the internal lobes.

17. The method of claim 1, wherein the elastomeric sleeve is positioned about the mandrel before the mandrel and the elastomeric sleeve are positioned in the mold.

18. The method of claim 1, further comprising applying a vacuum between the elastomeric sleeve and the mandrel to cause the elastomeric sleeve to conform to a geometry of the mandrel.

19. The method of claim 1, further comprising removing the mandrel from the elastomeric sleeve after the stator insert is removed from the mold, wherein the mandrel that is removed from the elastomeric sleeve is the same mandrel about which the elastomeric sleeve was positioned, and is the only mandrel used to produce the stator insert.

* * * * *